Feb. 3, 1925.
L. I. HEINTZ
1,525,074
SECTIONAL AUTOMOBILE BODY
Filed April 21, 1922
8 Sheets-Sheet 2
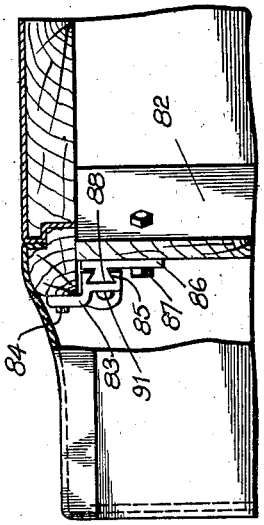
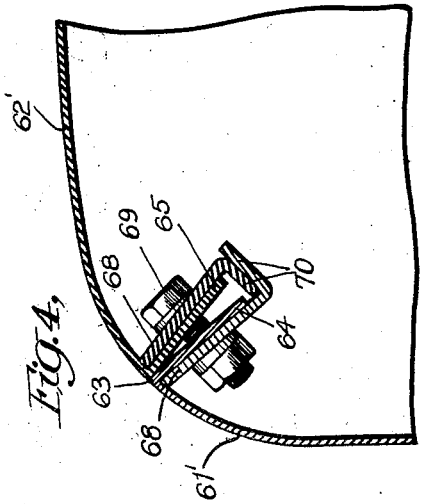
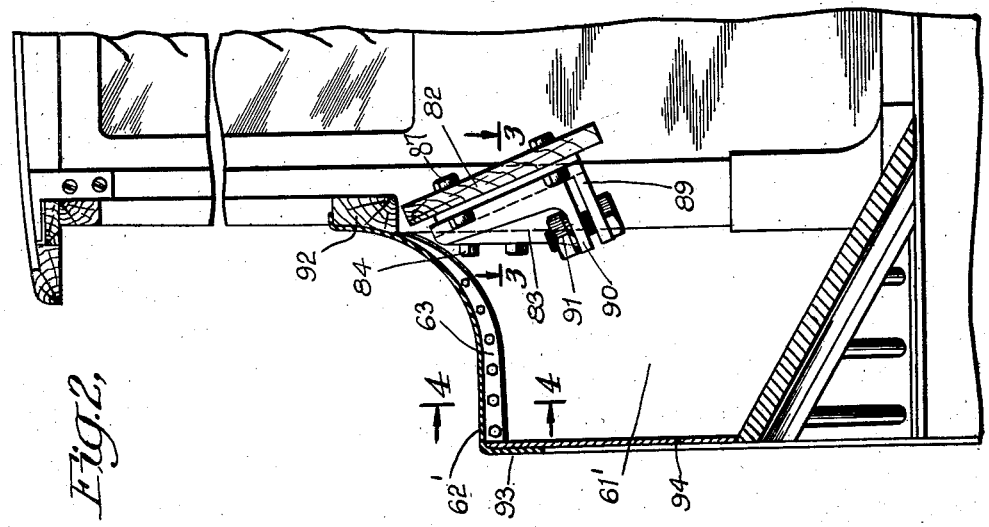
INVENTOR.
BY
ATTORNEY

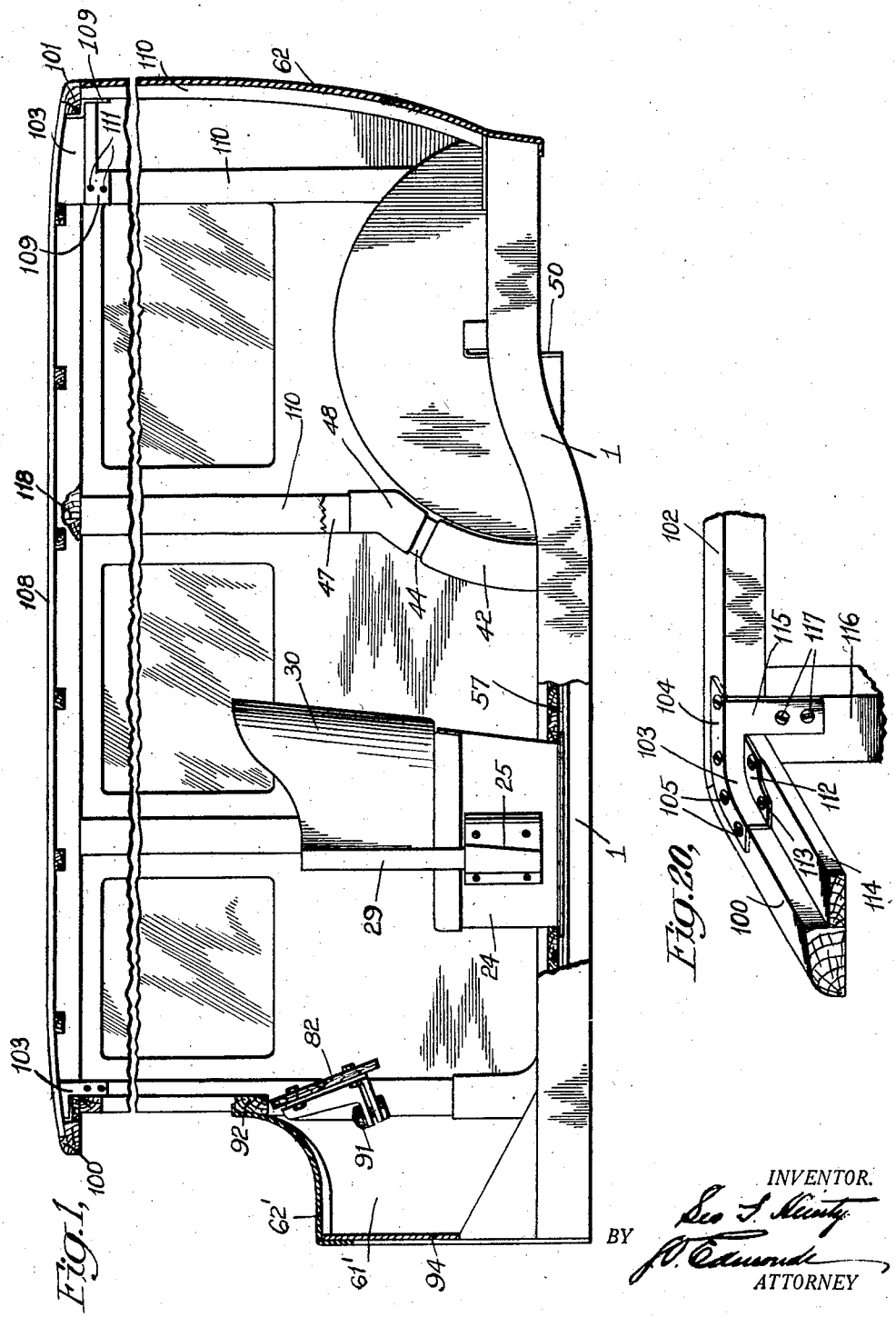

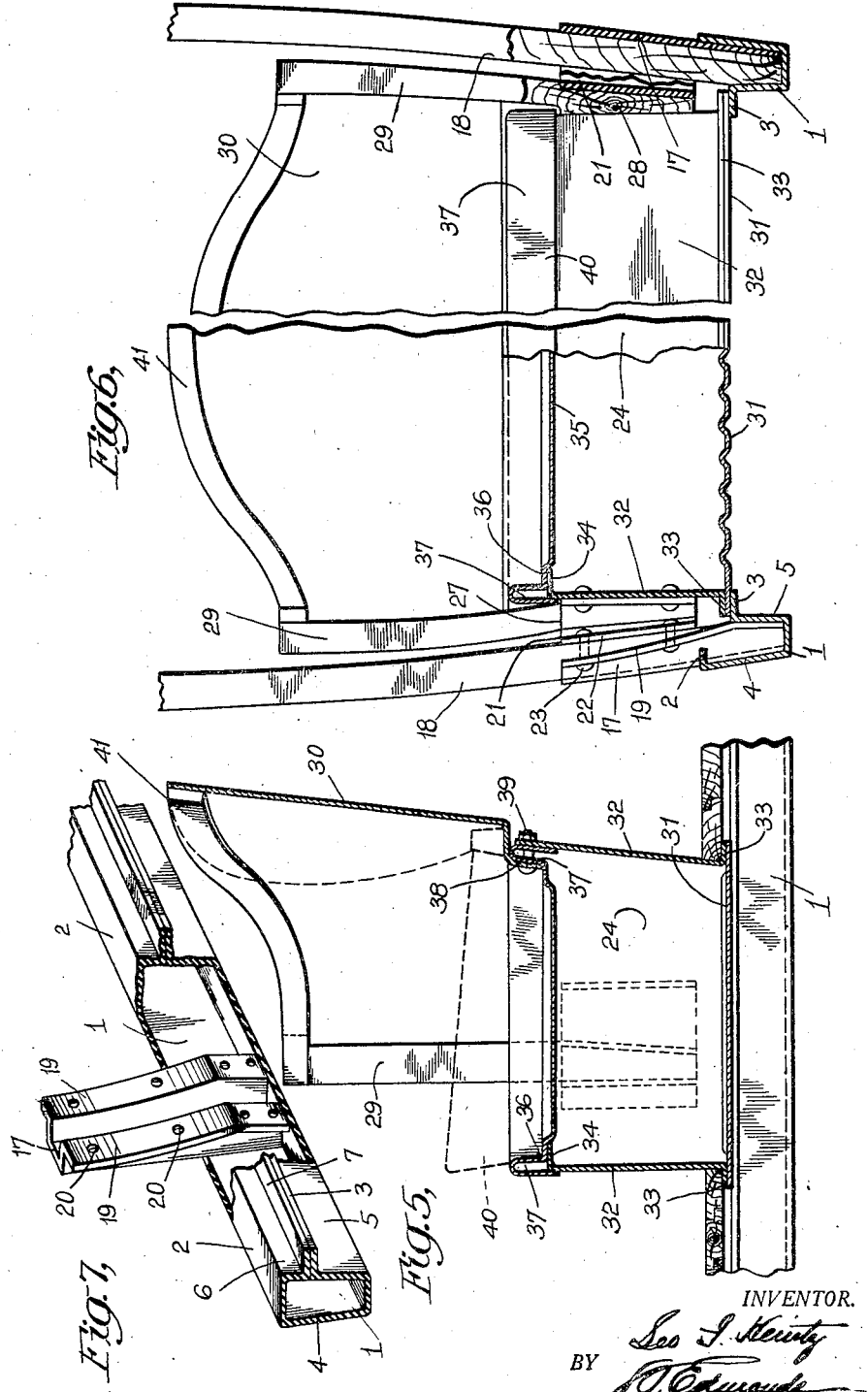

Feb. 3, 1925.　　　　　　　　　　　　　　　　　　1,525,074
L. I. HEINTZ
SECTIONAL AUTOMOBILE BODY
Filed April 21, 1922　　　8 Sheets-Sheet 4
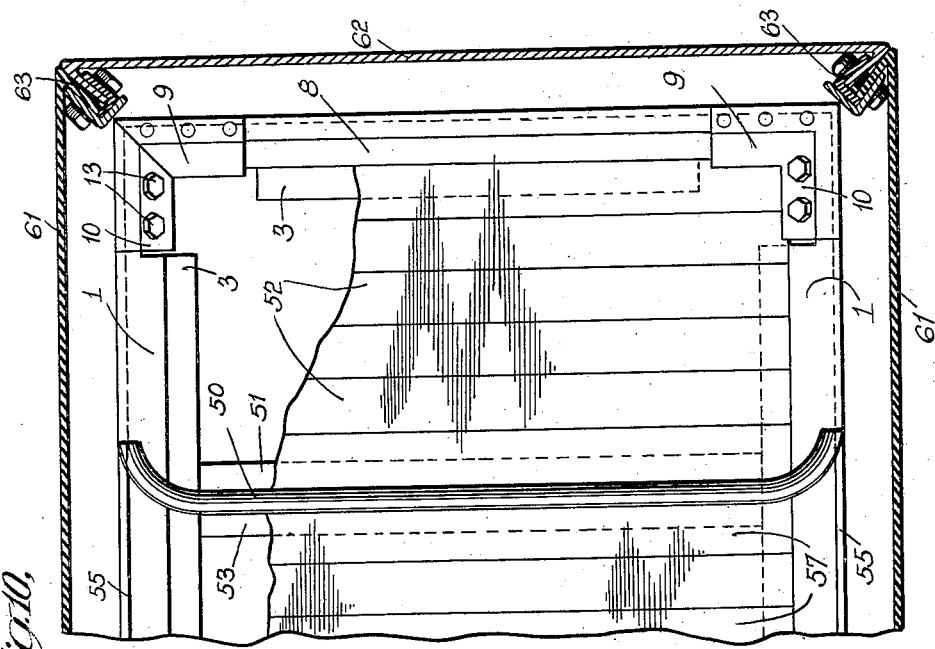
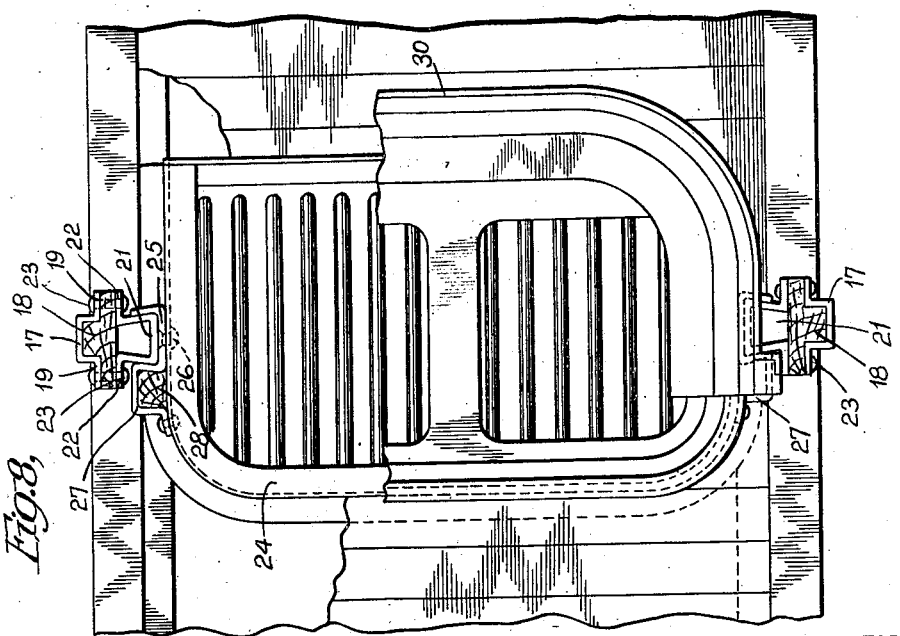
INVENTOR.
BY
ATTORNEY.

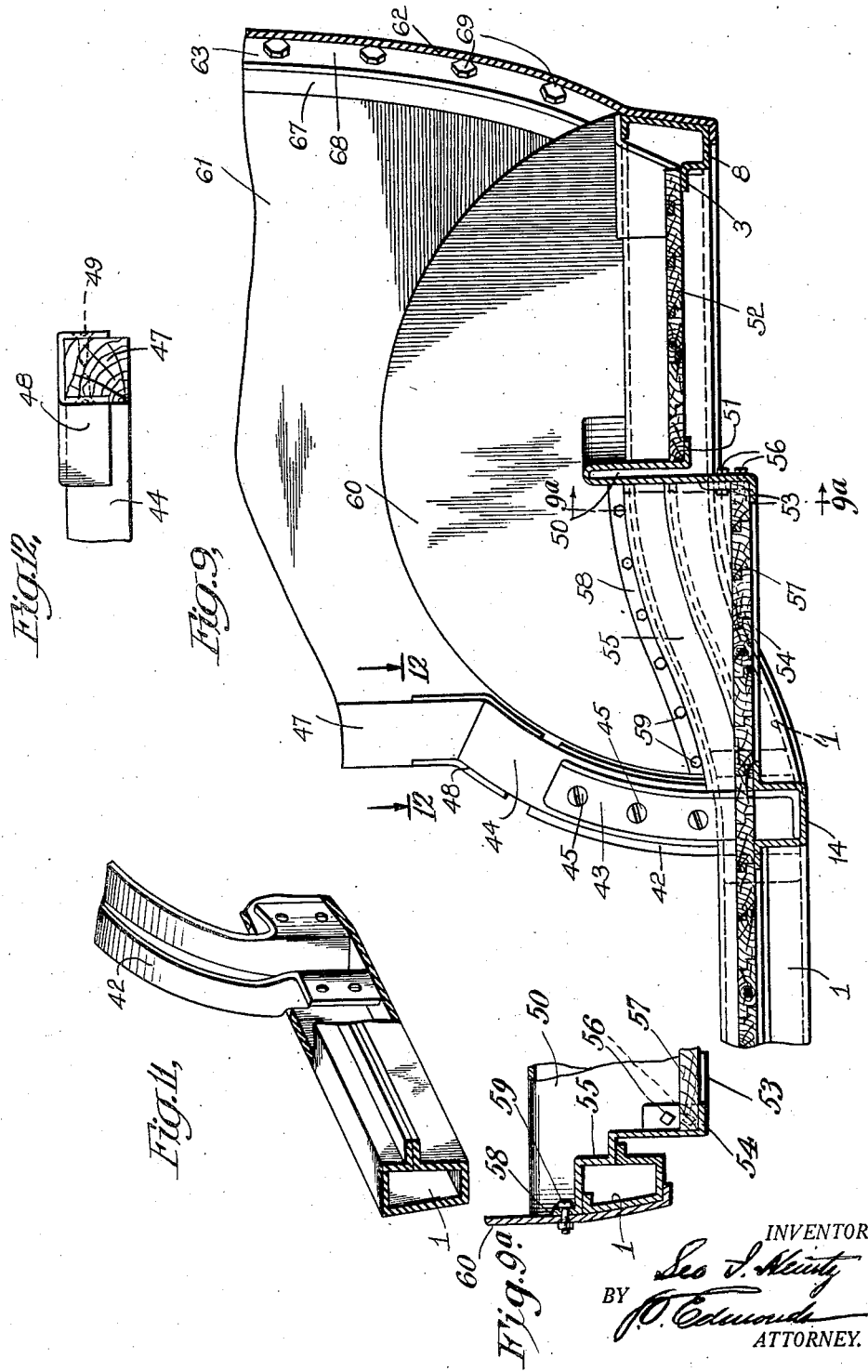

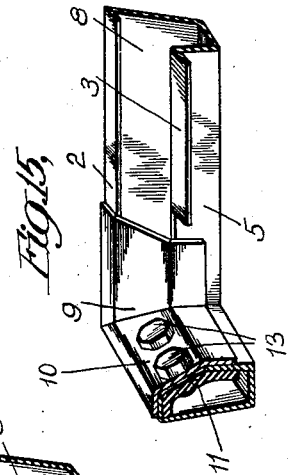
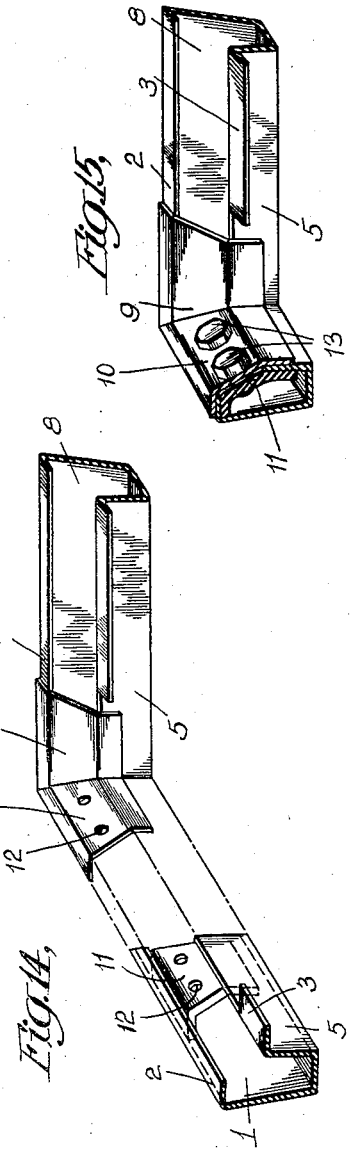
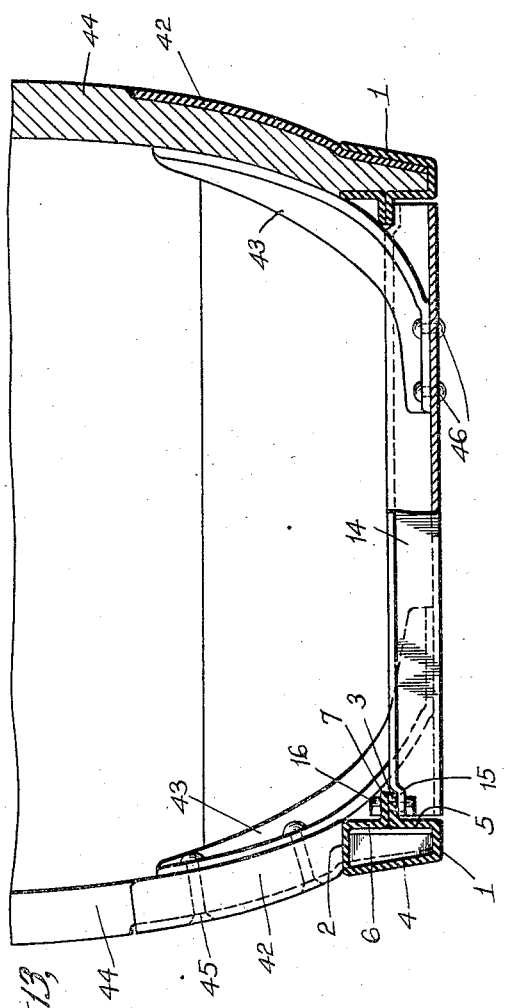

Feb. 3, 1925.
L. I. HEINTZ
SECTIONAL AUTOMOBILE BODY
Filed April 21, 1922
1,525,074
8 Sheets-Sheet 7
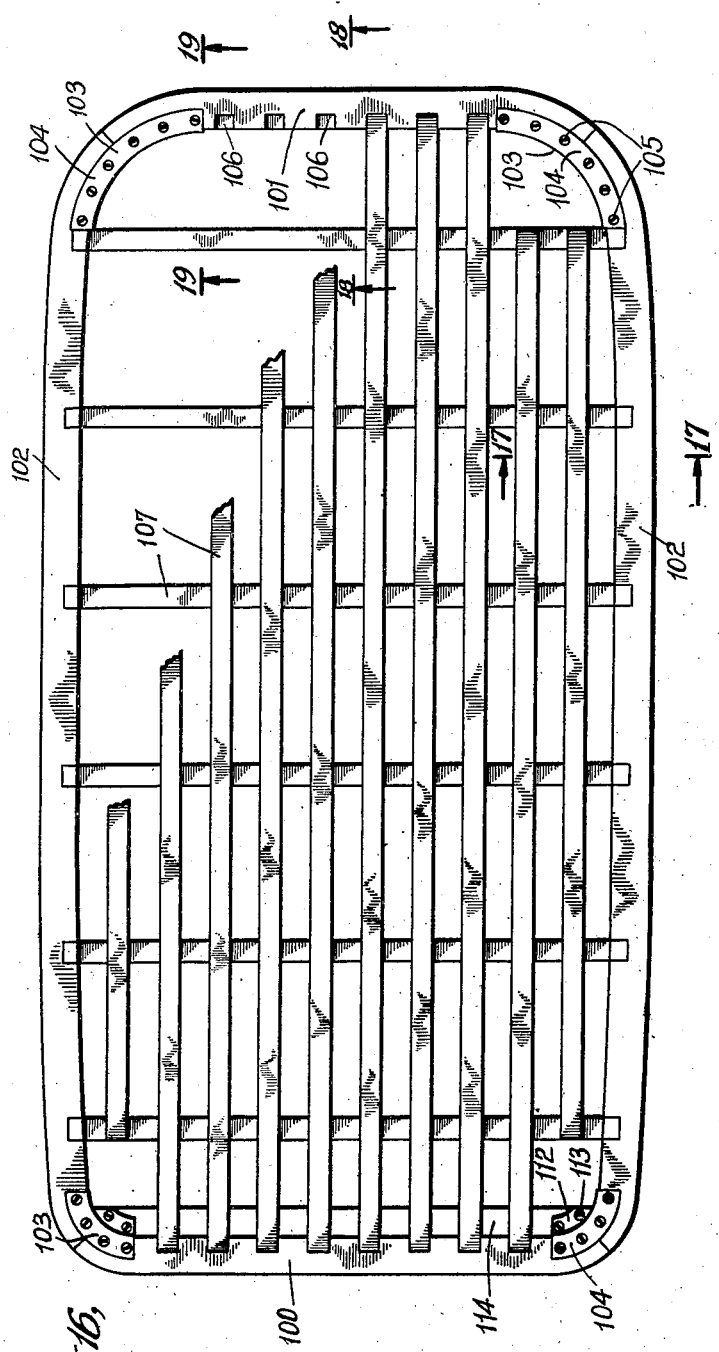
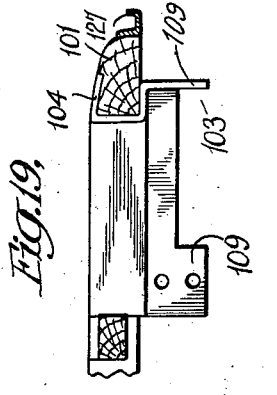
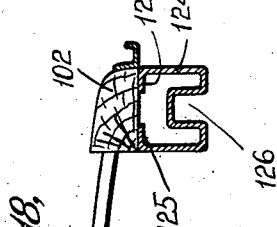
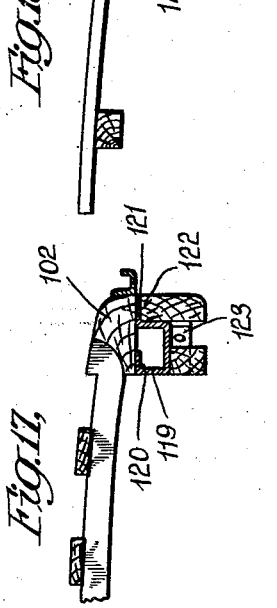
INVENTOR.
Leo I. Heintz
BY
ATTORNEY.

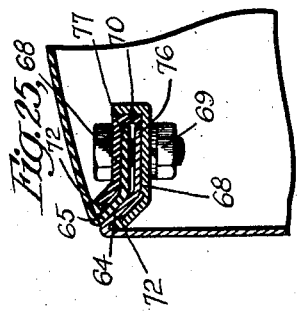
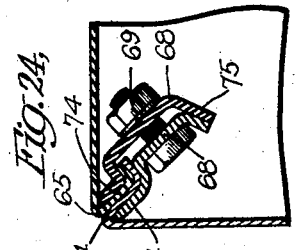
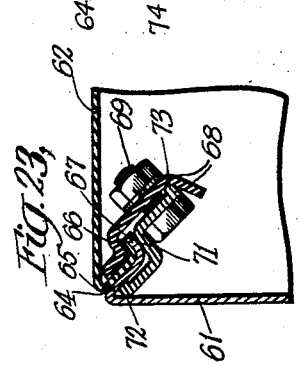
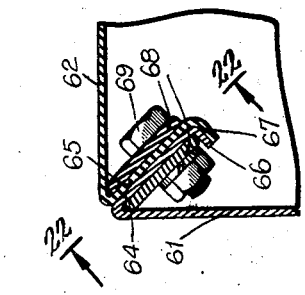
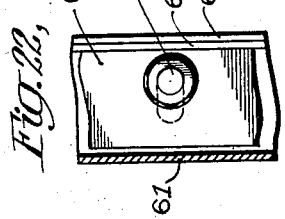
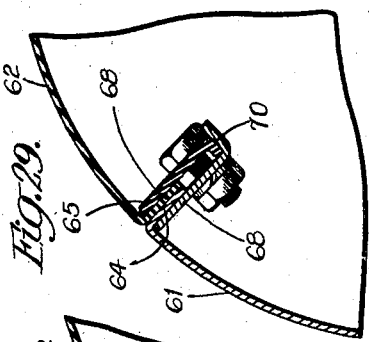
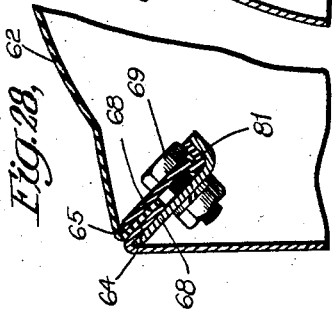
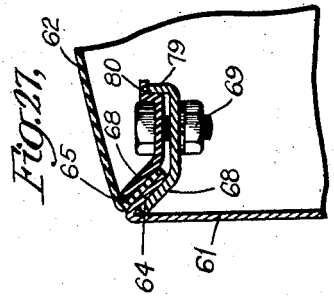
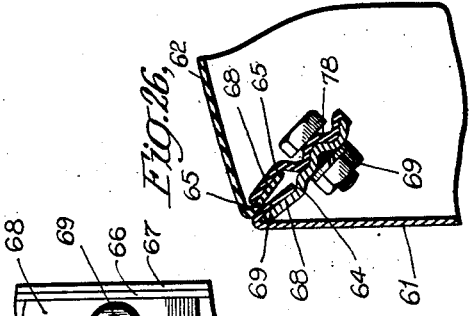

Patented Feb. 3, 1925.

1,525,074

UNITED STATES PATENT OFFICE.

LEO I. HEINTZ, OF PHILADELPHIA, PENNSYLVANIA, ASSIGNOR TO HEINTZ MANUFACTURING COMPANY, OF PHILADELPHIA, PENNSYLVANIA, A CORPORATION OF PENNSYLVANIA.

SECTIONAL AUTOMOBILE BODY.

Application filed April 21, 1922. Serial No. 555,805.

*To all whom it may concern:*

Be it known that I, LEO I. HEINTZ, a citizen of the United States, residing in the city and county of Philadelphia, and State of Pennsylvania, have invented certain new and useful Improvements in Sectional Automobile Bodies, of which the following is a specification.

This invention relates to sectional automobile bodies.

It is one of the objects of my invention to provide an automobile body made up of several units attached together after completion of the separate units. Another object of my invention is to provide an automobile body capable of being disjointed, and one which when disjointed may be packed into a compact space for shipping or the like. Another object of my invention is to split up the work of building the body, so that each of a plurality of separate body units may be completed, even to the trimming and painting before the final assembly of the units into a complete automobile body. This will greatly facilitate the handling and allow the work to remove more expeditiously through the factory. It also eliminates to a large extent the great amount of floor space usually required in building a body in the ordinary manner. A further object is to provide a method and means for joining adjacent body panels together along a joint, which from the outside has the appearance of the coach or carriage joint, and also providing a strengthening rib in the completed body structure. A further object of my invention is to provide as separate shipping units an instrument board, a front seat stool, a front seat back, rear seat heel board, cowl, tonneau and various cross members when needed to support floor boards or to provide stiffness to the body frame, said units being so constructed and designed that they may be easily and readily assembled into a complete knock-down body which is strong and serviceable and pleasing in its appearance. A further object of my invention is to provide similar elements, and in addition a knock-down roof section, all adapted to be attached together to form a complete knock-down closed body. Other objects of my invention will be in part obvious and in part pointed out hereinafter.

In accordance with my invention, I provide several frames either of wood or of metal or a composite of both, each frame being a part of a main assembly unit. These frames are arranged to support outside body panels and other elements, and the body panels, etc. are finished, even being trimmed and painted. The invention accordingly consists in the features of construction, combinations of elements and arrangement of parts which will be exemplified in the construction hereinafter set forth, and the scope of the application of which will be indicated in the following claims.

In order that a clearer understanding of my invention may be had, attention is hereby directed to the accompanying drawings forming a part of this application and illustrating certain possible embodiments of my invention. Referring to the drawings, Fig. 1 is a side elevation partly in vertical longitudinal section of an automobile body embodying my invention; Fig. 2 is a vertical longitudinal sectional view of a portion of the front of the body showing the instrument board and cowl and method of attaching these units in place; Fig. 3 is a horizontal section taken on the line 3—3 of Fig. 2; Fig. 4 is a sectional view of a portion of the cowl construction showing the joining of two adjacent cowl portions and is taken on the line 4—4 of Fig. 2; Fig. 5 is a vertical longitudinal section of the front seat portions of the body; Fig. 6 is a front elevation of the front seat portions of the body, certain parts being shown in section and certain parts being broken away for the sake of clearness; Fig. 7 is a perspective view of a portion of a side sill, including the socket for attaching the front seat; Fig. 8 is a top plan view of the front seat portion of the body, certain parts being shown in section and certain parts being broken away for the sake of clearness; Fig. 9 is a vertical longitudinal section through the rear portion of the body; Fig. 9ª is a sectional view taken on the line 9ª—9ª of Fig. 9; Fig. 10 is a horizontal longitudinal section through the rear portion of the body, certain parts being broken away for the sake of clearness; Fig. 11 is a perspective view of a side sill, including the socket for holding the rear door post; Fig. 12 is a sectional view of a detail of construction and is taken on the line 12—12 of Fig. 9; Fig. 13 is a transverse vertical section through the rear portion of the body showing the rear door posts and the means for securing the same in place; Fig. 14 is a perspective view showing a side sill and a method of connecting the same to the rear cross member, the parts being shown disconnected; Fig. 15 is a view similar to the view of Fig. 14 showing the sill and the cross member connected together; Fig. 16 is a plan view of the roof, certain parts being broken away; Figs. 17, 18 and 19 are sectional views of details of the roof construction and are taken respectively on the lines 17—17, 18—18 and 19—19 of Fig. 16; Fig. 20 is a perspective view of the roof frame at a corner showing the method of joining the roof frame to a body post; Fig. 21 is a sectional view showing a method of joining two adjacent body panels together; Fig. 22 is a side view on the line 22—22 of the joint shown in Fig. 21; Fig. 23 is a sectional view of a modified panel joint; Fig. 24 is a sectional view of another modification of a panel joint; Fig. 25 is a sectional view of another modification of a panel joint; Fig. 26 is a sectional view of another modification of a panel point; Fig. 27 is a sectional view of another modification of a panel joint; Fig. 28 is a sectional view of another modification of a panel joint; and Fig. 29 is a sectional view of another modification of a panel joint. Similar reference characters refer to similar parts throughout the several views of the drawings.

Referring to the drawings, I provide a pair of suitable side sills 1, preferably of sheet metal bent into channel form with the opening of the channel uppermost and having horizontal flanges 2 and 3 extending respectively from the outer wall 4 and the inner wall 5 of this sill, except where the sill crosses a doorway, and at such places the flange 2 is preferably extended inwardly and then downwardly, as at 6, and then inwardly in the form of a horizontal flange 7 superimposed over the flange 3. In this way the sill 1 forms at the doorway a closed box, the upper wall 2 serving as a threshold strip across the doorway, and the outer wall 4 constituting a body panel under the doorway. I provide a rear cross member 8 similar in shape to the sills 1 and connected at its ends to the rear ends of the two side sills 1 by means of an angle plate 9 welded to the upper flange 2 and the inner wall 5 of the cross member 8, and having a portion 10 adapted to overlap the flange 2 and the inner wall 5 of the sill 1, and also to overlap a metal plate 11 welded to the under side of the flange 2 of the sill 1 and to the inner side of its wall 5, the plate 10 and the plate 11 being provided with registering perforations 12 through which bolts 13 may be placed to secure the parts together. In addition to rear cross member 8, other cross members may be provided between the sills 1 wherever desired. Such cross members 14 may be provided with horizontal flanges 15 at their ends adapted to underlie the superimposed flanges 3 and 7 of the side sills, and to which they may be bolted, as at 16. The cross members 14 may be attached as well by bolting the same to the single flange 3 or to the side walls of the sills 1. At suitable places on the side sills I either provide integral or attachable sockets for posts. These sockets are preferably channel shaped and may either be welded to the side sills, or if it is desired to have them detachable, they may be mounted thereon by means of bolts. The sockets 17 for the front seat posts are preferably arranged to have an inwardly opening channel in which a post 18 is received. Each socket 17 is provided with outwardly extending flanges 19 perforated as at 20. A channel shaped member 21 having flanges 22 corresponding with flanges 19 of the socket 17 is adapted to be bolted or riveted, as at 23, to the socket 17. The member 21 is adapted to support the front seat stool 24, and for this purpose the member 21 is slightly dovetailed in cross section and tapered, with the reduced portion uppermost. A correspondingly shaped and tapered member 25 is bolted or riveted, as at 26, to the end of the seat stool 24. The seat stool is mounted in position by sliding the member 25 over the tapered member 21, the wedging action between these parts resulting in a secure and firm mounting of the front seat stool. However, the front seat stool may be readily detached by merely lifting it from its supports 21. If desired, the member 25 may be extended in substantially Z-shape to form a downwardly tapering socket 27 adapted to receive a correspondingly tapered end 28 of a post 29, to which is secured the front seat back 30. By this method the front seat back may be secured in place by merely sliding the ends 28 of the seat back posts 29 into the sockets 27 until the seat back is securely and firmly wedged in place.

The seat stool 24 above referred to may include a horizontal lower metal plate 31 which supports a vertical sheet of metal 32 bent into oval shape, and which provides the front, rear and side walls of the seat stool. The member 32 has preferably a lower horizontal flange 33 which is welded to the plate 31 near its edges. The top edge of the front and side wall portions of the member 32 may be provided with the horizontal flange 34 adapted to support the front and side edges of a seat pan 35, the seat pan 35 having preferably at its front and sides a horizontal flange 36 adapted to rest upon the flange 34. An open vertical fold 37 extends about the seat pan, which at the front and sides overlaps the outside of the member 32, but at the rear of the seat overlaps the portion 32 on the inside. The seat back portion 30 has a vertical flange 38 overlapping the rear portion of the fold 37 on the inside, and the parts 38, 37 and 32 may be secured together by bolts, as at 39. A suitable seat cushion 40 may be placed on the seat pan 35. If desired, a reenforcing strip 41, either of metal or wood and having the desired contour of the seat back 30, may be extended between the opposite posts 29, and the upper edge of the paneling 30 may be welded to this cross member 41, or be otherwise secured thereto. Preferably, the cooperation between the members 21 and the side sills 1 and the sockets 27 carried by the seat stool member 32 is such that the metal bottom member 31 of the seat stool rests upon the inturned flanges 3 of the side sills, thus effecting a more positive support of the parts which enter into the construction of the front seat.

On the side sills and at a suitable distance to the rear of the front seat are positioned two sockets 42 for the rear door posts. Similarly with the other sockets, these may be secured to the side sills 1 by means of welding or bolts and are channel shaped in cross section. Preferably, these socket pieces are curved rearwardly on account of the proximity of the rear wheel of the machine, and outwardly to give a graceful contour to the tonneau. In order to secure rigidity in the construction at this point, I preferably employ a cross member 14 attached to the flanges of the sills 1, as at 16, and provide a bracket 43, one end of which abuts against the inside of the rear post 44, and is bolted or riveted thereto, as at 45, and the other end of which bracket 43 abuts against a surface of the cross member 14 and is bolted or riveted thereto, as at 46. The post 44 conforms to the curvature of the socket 42 for a certain distance and then preferably extends in a vertical direction. The vertical portion 47 of the post may be separate from the portion 44, and the two portions may be joined together by means of a channel shaped plate 48 secured to the abutting ends of the post portions 44 and 47 as by means of screws 49. Rearwardly of the posts 44 the main sill members curve upwardly to a certain extent and then extend horizontally to provide room for the mounting of the rear axle parts. The heel board 50 for the rear seat may be constructed so as to be channel shaped in vertical section, having a flange 51 extending rearwardly at the same height as are the flanges 3 of the side sills 1 and the rear cross member 8 upon which suitable boards or a sheet of metal may be placed. The heel board 50 is supported at its ends by the side sills 1, and to which it may be secured by bolting or welding. The heel board 50 is also formed to have a horizontal flange 53 cooperating with a flange 54 on a separate metal piece 55 which is secured to the side sills 1, and also is secured to a heel board 50 by welding or by means of bolts 56. Floor boards 57 may be supported on the flanges 53 and 54. The member 55 may also be provided with a vertical flange 58 to which may be secured, as by bolts 59, the body panel portion 60 which is inside of the rear wheel of the machine. The tonneau is completed by providing suitable body panels, these preferably comprising a pair of side panels 61 and a panel 62 extending between the side panels 61 at the rear of the body and joined together along a novel seam or joint 63. This joint is so constructed that from the outside it has the appearance of the conventional coach or carriage joint, but in reality it is a unique arrangement whereby the edges of the body panels are securely clamped together, this making the panel at this joint very strong. In addition, the joint is such as to provide a strengthening rib in the completed body structure.

This joint consists of a flange 64 integral with and turned inwardly from the body panel 61 and a complementary flange 65 integral with and turned inwardly from the body panel 62. At the inner edge of flange 64 there is another flange 66 interlocking with a complementary flange 67 at the inner end of the flange 65 (Figs. 21 and 22), the flanges 66 and 67 acting as a register so that the body panels 61 and 62 will present a continuous curvature without offset. Flanges 66 and 67 may either be integral with the flanges 64 and 65, or may comprise separate pieces attached respectively to said members. These flanges 64 and 65 may be reenforced with suitable strips 68, preferably of sheet steel, and bolts 69 are threaded through the reenforcing strips 68 and the two flanges 64 and 65, so that upon tightening the bolt 69 the edges of the adjoining panels are drawn and held tightly together to such an extent that there will be no weaving or working apart at the joint.

Another and a preferable form of this joint comprises attaching a reenforcing strip 68 to each of the inwardly projecting flanges 64 and 65, as by means of welding the strips thereto (see Fig. 4). These inwardly projecting flanges 64 and 65 slightly recede one from the other, and the ends of the reenforcing strips 68 carry oppositely disposed and interlocking flanges 70. With this arrangement, when the bolt 69 is tightened, pressure will be transmitted to the extreme outer and inner edges of the reenforcing strips 68, and thereby clamps the body panels together so tightly that there will be no weaving or working at the joint. It is to be understood that the reenforcing strips 68 need not be attached to the flange of the body panel, but may be made removable. Also these reenforcing members need not extend the full length of the joint, but may be made in short units. The registering panel flanges and cooperating reenforcing strips are preferably arranged so as to provide a confining action, that is, such an action as will enable the transverse panel sections, such as the top of the cowl and the back of the tonneau, to hold the side sections together. This feature aids materially in assembling the various body units together.

Several modified methods of joining panel sections together will now be described. As shown in Fig. 23, the reenforcing strips 68 need not be secured to the panel flanges 64 and 65, but may be shaped to provide a confining channel, as at 71, to receive and hold the flanges 66 and 67, the reenforcing strip 68 being provided with two small end flanges 72 pressing against the flanges 64 and 65 at the corner of the joint, and pivotally cooperating at their opposite ends, as at 73, so that when the bolt 69, which extends only through the reenforcing members, is tightened, severe clamping pressure will be brought to bear on the panel flanges close to the panels themselves. The modification illustrated in Fig. 24 is somewhat similar to the modification just described, except that the inner ends of the reenforcing strip 68 have flat surfaces clamping against the panel flanges 64 and 65, as at 74, and the outer ends of the reenforcing strip 68 have abutting flat surfaces, as at 75, creating a wedging action when the bolt 69 is tightened. The joint can be further modified by extending the panel flanges 64 and 65 to provide two spaced flange portions 76 and 77 (Fig. 25), the inner ends of reenforcing strips 68 cooperating through oppositely disposed interlocking flanges 70 to provide a pivot bearing, and having small clamping flanges 72 at their inner ends. In Fig. 26 the inner ends of the reenforcing strip 68 are welded to diverging panel flanges 64 and 65, and the outer ends of the reenforcing strip 68 have interlocking corrugated portions, as at 78. The bolts 69 extend through the corrugated portions of the reenforcing strips to clamp the body panels together. Instead of corrugating portions of the reenforcing members, they may be extended as shown in Fig. 27, the end of one strip 68 having a flange 79 interlocking with a rabbet 80 on the other strip to provide a pivotal bearing, and causing the desired clamping action at the joint when the bolt 69 is tightened. As another modification, and as illustrated in Fig. 28, the reenforcing strips 68 may be welded at their inner ends to the panel flanges 64 and 65, and one of the members 68 may be L-shaped and the other member supplied at its end with a shoulder or bead portion 81 seated in the angle of the L and interlocking therewith to provide the pivotal bearing, whereby the tightening of the bolt 69 causes the opposite ends of the reenforcing strip 68 and the panel flanges attached thereto to be firmly clamped together. A similar arrangement is shown in Fig. 29, except that the reenforcing members have oppositely disposed interlocking flanges 70, as shown in Fig. 25.

As one of the main assembly units I provide an instrument board 82, and provide means for detachably assembling the same into the automobile body. My means for mounting the instrument board includes the provision of a pair of bracket members 83, one attached to each of the front posts of the body, as by means of bolts 84. This bracket member 83 presents a tapered channel 85 dovetailed in cross section toward the rear of the body, the taper being reduced at its upper end. On the instrument board 82 I attach a pair of plates 86 as by means of bolts 87. Each plate 86 is provided with a tapered tongue or male portion 88 adapted to be slid upwardly into the channel 85 of the member 83, and is also provided with a flange portion 89 adapted to be secured to a flange portion 90 on a socket piece 83, as by means of bolts 91. The arrangement is such that the instrument board 82 may be assembled into the construction by sliding the portions 88 into the channels 85 and thereafter securing the parts firmly together by inserting bolts 91 and tightening them. Obviously, the instrument board may be readily detached by loosening the bolts 91 and sliding the instrument board 82 off its socket members 83.

The cowl of the body may be constructed of two or more suitably shaped panel portions joined together along a suitable joint, which is preferably a joint constructed as above described. The cowl may comprise a middle panel 62' and side panels 61'. The inner edges of these panels may be supported upon and secured to a wooden cross member 92 which extends between and is attached to the opposite front door posts. The outer edges of these panel pieces may have a vertical flange 93 to which a dash board 94 may be welded or otherwise secured.

The above principles and features of construction may be combined as well in the open types of automobile bodies as in closed types, and the various details of construction may be modified in accordance with the particular design and shape of the body desired. If it is desired to construct a closed type of automobile body, I extend the posts up to the roof and preferably provide a knock-down roof which may be removably supported on the tops of these posts. In this type of car there is preferably an upper framework connecting the posts and extending around the outer periphery of the machine. The body panels extend up to the roof and are secured to these frame members in any well known manner.

In my preferred construction, the knock-down roof is constructed of a frame comprising front member 100, rear member 101 and side members 102. These members are preferably of wood and are joined together at the corners by metal bracket pieces 103, having an upper horizontal flange 104 overlapping the tops of two adjoining frame members and secured to both by means of bolts or screws 105. The frame members 100, 101 and 102 are preferably notched, as at 106, and a desired number of wooden cross pieces 107 extend between the cross members of the frame and are supported thereby, the ends of the members 107 being seated in the notches 106. A suitable cover 108 is stretched over the frame and the cross members 107, being secured to these elements by any well known means.

At the rear of the machine the frame member 101 is flush. Here the brackets 103 are channel shaped in cross section and have downwardly extending flanges 109 adapted to abut against the inner surface of posts 110 near the rear of the machine, and to which the brackets and the roof may be attached by means of screws 111. At the front of the machine the roof is projected forwardly to some extent. To accomplish this the bracket members 103 at the front of the machine have an inwardly extending horizontal flange 112 to which is secured, as by means of screws 113, a wooden cross member 114. Behind the flange portion 112 is a downwardly extending flange 115 on the bracket 103. This flange 115 is adapted to abut against the rear surface of the front post 116 at the body and is suitably secured thereto as by means of bolts or screws 117. To further secure the knock-down top in position on the body, I provide dowel pins 118 extending upwardly from the tops of posts of the automobile body and adapted to register with and be received in complementary holes in the frame members of the knock-down top. Where the top extends over the door the construction may include a metal plate 119 (Fig. 17) extending across the top of the doorway. This plate is shown channel shaped, with the opening of the channel upwards, and has an inwardly extending flange 120 and an outwardly extending flange 121 both abutting against the under side of a side frame member 102. This plate 119 may be secured to the member 102 by means of screws 122 extending through the flange 121. At its ends it may be provided with a downwardly extending flange portion 123 which may be secured to a door post. Where the roof extends over the rear side window a metal member 124 (Fig. 18) may be provided. Preferably, this metal piece extends the full length of the window and has two upper horizontal flanges 125 by which it is secured to the under side of the frame member 101. The upper edge of the window is adapted to be seated in a channel 126 formed centrally along the lower surface of piece 124.

If desired, the usual drip molding 127 may be attached to the frame members of the roof in the usual manner.

From the above it will be apparent that by my improved method and features of construction an automobile body may be built by providing a number of separate units which are individually finished, and which may be later assembled to form a complete body. These separate units, as above pointed out, may include two sill members and the post sockets, either attached to or separate from the sill members. The sill members may be suitably perforated at desired points for the attachment of the desired cross members, and, in addition, the outer walls of the sill members and their upper flanges where they cross a doorway, may be completely finished and painted. The cross member, including the rear cross member 8, also constitute separate units. These also may be perforated so that they may be quickly bolted to the side sills. The front seat may be assembled as a main unit in the manner above described, and may readily be assembled into the completed automobile body by merely disposing the seat unit on the seat supporting sockets 21. Suitable body panels may also be shipped as separate units, if desired, and may be readily secured together by means of my improved joint, described above. Another main unit may consist of the instrument board, which also can readily be attached or detached from the body as described above.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What I claim is:—

1. In automobile body construction, a front seat unit comprising, in combination, a front seat stool, socket members secured thereto, and a front seat back having posts removably seated in said sockets.

2. In automobile body construction, in combination, frame members, a front seat stool having sockets secured thereto, and members connected with said frame members and removably seated in said sockets, whereby said seat stool is detachably supported on said frame members.

3. In automobile body construction, the combination of a body frame, a front seat stool having socket members secured thereto, a front seat back having posts removably seated in some of said sockets, whereby said back is detachably supported on said stool, and members connected with said frame and removably seated in others of said sockets, whereby said seat stool is detachably supported on said frame.

4. In automobile body construction, the combination of a front seat stool, a front seat back, members having tapered sockets secured to said stool, and posts secured to said back, said posts having tapered ends removably wedged in said sockets whereby said back is detachably held in place on said stool.

5. In automobile body construction, the combination of a body frame, a front seat stool, and means for removably securing said front seat stool in place on said frame, said means comprising a channel shaped member connected with said frame and adapted to interlock with complementary member secured to said seat stool.

6. In automobile body construction, the combination of a body frame, a front seat stool and a front seat back, a tapered channel member secured on said frame, a post portion secured to said seat back, and means secured to said seat stool and adapted to cooperate with said tapered member and with said post, whereby said back is removably held in place on said stool, and whereby said seat stool is removably held in place on said frame.

7. In automobile body construction, the combination of a body frame having a pair of sill members, one on each side, a pair of oppositely disposed sockets, one on each of said sills, a pair of tapered dovetailed members, one secured to each of said sockets, a front seat stool, a pair of members Z-shaped in cross section, one secured at each end of said stool, each of said Z-shaped members providing a tapered channel for one of said tapered dovetailed members and interlocking therewith, a front seat back having a post at each end, another portion of each of said Z-shaped members providing a tapered socket adapted to receive and hold the lower end of one of said posts.

8. In automobile body construction, a seat stool comprising, in combination, an upright sheet metal stool body member having a front wall, a rear wall and side walls, and having an upper horizontal flange, and a seat pan resting upon and supported by said flange, said pan having a marginal vertical flange overlapping the front and side walls of said upright member on the outside, and overlapping the rear wall of said member on the inside.

9. In automobile body construction, a seat stool comprising, in combination, an upright sheet metal stool body member having a front wall, a rear wall and side walls, and having an upper horizontal flange, and a seat pan resting upon and supported by said flange, said pan having a vertical flange along its rear edge, a back panel having a portion adjacent said vertical flange, and means engaging said panel, rear wall, and pan flange, securing said parts together.

10. In automobile body construction, a seat stool comprising, in combination, an upright sheet metal stool body member having a front wall, a rear wall and side walls, and having an upper horizontal flange, and a seat pan resting upon and supported by said flange, said pan having a marginal vertical fold along its rear edge, the outside wall of said fold overlapping the rear wall of said upright member on the inside, a back panel, the lower edge of said panel overlapping said fold on the inside, and a bolt engaging said wall, fold and panel edge, for securing said parts together.

11. In automobile body construction, a seat stool comprising, in combination, an upright sheet metal stool body member having a front wall, a rear wall and side walls, and having an upper horizontal flange, and a seat pan resting upon and supported by said flange, said pan having a marginal, vertical open fold along its edge, the outside wall of said fold overlapping the front and side walls of said upright member on the outside and overlapping the rear wall of said member on the inside, a back panel having a lower portion overlapping on the inside of the portion of said fold which is adjacent the rear wall of said upright member and a bolt engaging said panel portion, said fold and said rear wall, for securing said parts together and for drawing inwardly against the front wall of said upright member the portion of the fold which overlaps said front wall.

12. In automobile body construction, a separate and completed front seat stool unit, comprising, in combination, a bottom plate, front, back and side portions having lower horizontal flanged portions secured to said plate, and an upper plate having a vertical marginal open fold and supported on and secured to said front back and side portions.

13. In automobile body construction, a separate and completed front seat back unit, comprising, in combination, a panel portion constituting the rear and sides, a vertically disposed post at each end of said panel portion and secured thereto, and a reenforcing strip shaped to the contour of said panel and extending between said two posts and secured to said panel portion along its upper edge.

14. In automobile body construction, a front seat back, comprising, in combination, a panel portion constituting the rear and sides, a vertically disposed post at each end of said panel portion, a reenforcing strip shaped to the contour of said panel and extending between said two posts and secured to said paneling along its upper edge, a front seat stool, a socket member secured to said stool at each end, adapted to receive and support said posts, said paneling having a horizontally disposed rabbet along its lower edge removably secured to and supported on the rear edge of said stool.

15. In automobile body construction, the combination of a pair of side sills, and a rear seat heel board extending between said side sills and secured thereto, said heel board, including a transverse portion, substantially channel-shaped, having a rearwardly extending horizontal flange for rear seat boards and a forwardly extending flange for floor boards.

16. In automobile body construction, the combination with a side sill having a portion curved upwardly, of a metal member secured to said sill along said curving portion and having an inwardly extending horizontal flange, and floor boards supported on said flange, a body panel adjacent said sill, and a flange on said member abutting and secured to said panel.

17. In automobile body construction, the combination with a side sill having two horizontal flanges at different elevations, a panel having a portion adjacent the outside of said sill, and floor boards, of a metal member having two horizontal flanges positioned to rest respectively upon said two sill flanges and having another horizontal flange in supporting position beneath said floor boards, and having an upper vertical flange abutting and secured to said panel.

18. In automobile body construction, in combination, a pair of body posts on opposite sides of the body, an instrument board, and means for removably securing said board to said posts, said means including a pair of relatively movable interlocking members, one on said post and the other on said board, and a bolt adjustably engaging both of said members.

19. In automobile body construction, in combination, a pair of body posts on opposite sides of the body, a bracket on each of said posts, an instrument board, plates on said board, one adjacent each end, said plates having tapered tongues, dovetailed in cross section, tapered grooves on said brackets for said tongues, and means, comprising bolts, each engaging both a bracket and a plate, for removably wedging and holding said tongues in said grooves, whereby said board is detachably held in place on said body.

20. In automobile body construction, in combination, two panels placed edge to edge, each panel having a flange extending inwardly from its said edge, interlocking levers engaging said flanges from opposite directions at the said edges of said panels and fulcrumed interiorly of said points of engagement, and means for drawing said levers against said flanges for binding said panels together.

21. In automobile body construction, in combination, two panels placed edge to edge, each panel having a flange extending inwardly from its said edge, interlocking levers engaging said flanges from opposite directions at the said edges of said panels and fulcrumed interiorly of said points of engagement, means for drawing said levers against said flanges for binding said panels together, and means comprising interlocking portions on said flanges for aligning said panel edges with each other.

22. In automobile body construction, in combination, two panels placed edge to edge, each panel having a flange extending inwardly from its said edge, interlocking levers engaging said flanges from opposite directions at the said edges of said panels and fulcrumed interiorly of said points of engagement, means for drawing said levers against said flanges for binding said panels together, and means comprising portions on said flanges interlocking with each other and with said levers for aligning said panel edges, and for restraining said levers from rearward movement on said flanges.

23. In automobile body construction, in combination, two panels placed edge to edge, each panel having a flange extending inwardly from its said edge, and clamping means for binding said panels together, said means comprising a pair of levers having portions engaging said flanges from opposite directions at the edges of said panels, a fulcrum for said levers positioned inwardly of said panel edges, and adjustable means engaging said levers intermediate their flange engaging portions and said fulcrum for drawing said flange engaging portions toward each other to bind the panel edges together.

24. In automobile body construction, in combination, two panels placed edge to edge, each panel having a flange extending inwardly from its said edge, and clamping means for binding said panels together, said means comprising a pair of levers having portions engaging said flanges from opposite directions at the said edges of said panels and having interengaging portions removed from said flange engaging portions and constituting a fulcrum for said levers, a bolt extending through both said levers intermediate their flange engaging portions and said fulcrum, and a nut on said bolt adjustable to force said flange engaging portions toward each other.

25. The combination with a side sill having an upper flange and an inner wall, and a cross member having an upper flange and an inner wall, of a plate secured to said sill's flange and wall, an angle plate secured to said cross member's flange and wall, perforations in both said plates located for mutual registration, and means, including bolts penetrating said perforations, for detachably securing said sill and cross member together.

This specification signed and witnessed this 17th day of April, 1922.

LEO I. HEINTZ.

Witnesses:
WALTER H. D'ARDENNE,
D. J. KENNEDY.